Patented Aug. 23, 1938

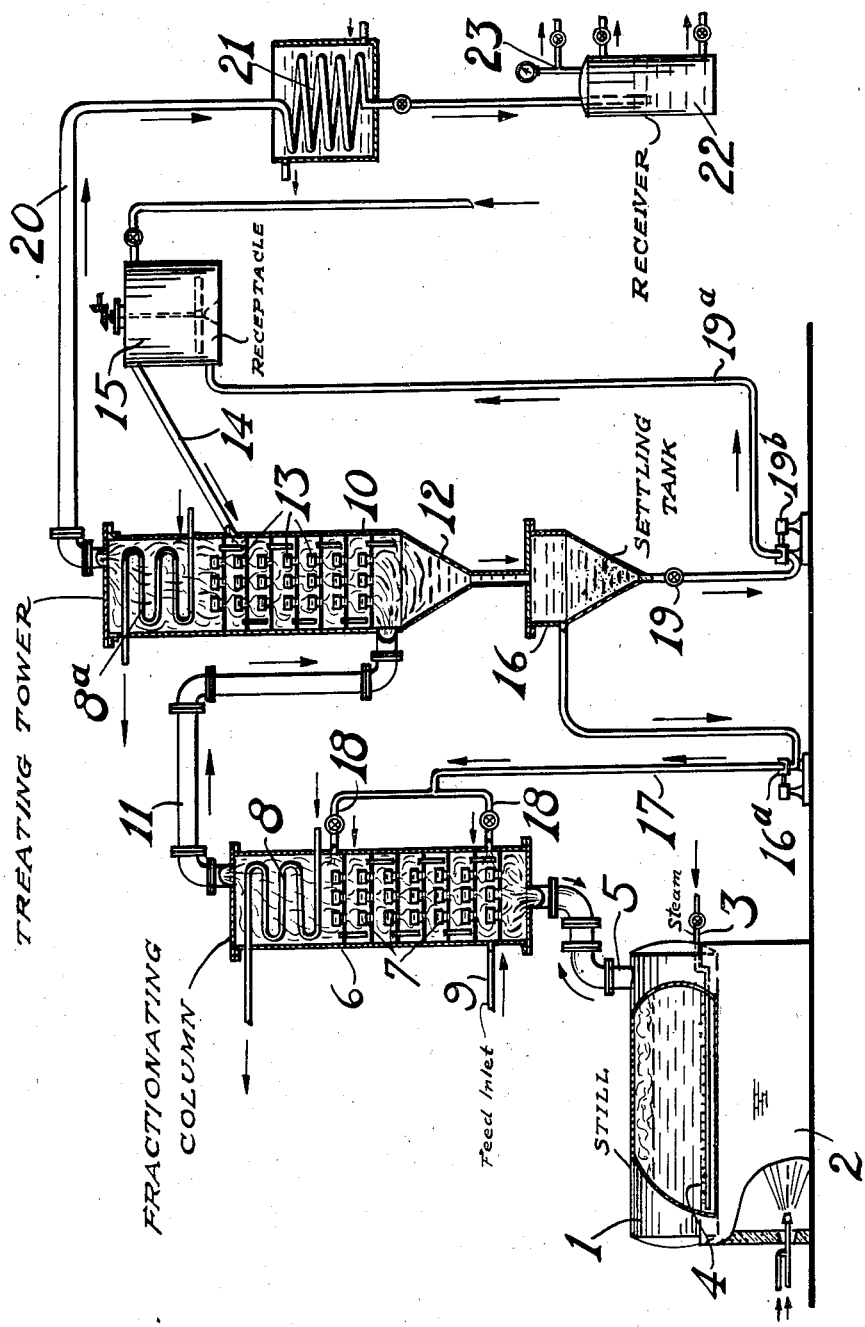

2,127,654

UNITED STATES PATENT OFFICE

2,127,654

PROCESS FOR TREATING HYDROCARBON DISTILLATES

Reginald K. Stratford, Sarnia, Ontario, Canada, assignor to Standard Oil Development Company, a corporation of Delaware Application August 10, 1934, Serial No. 739,194

6 Claims. (Cl. 196—96)

This invention relates to an improved process of treating hydrocarbon oils, particularly naphtha or gasoline produced by a cracking process, and will be fully understood from the following description when read in conjunction with the drawing, the sole figure of which is a diagrammatic side elevation partly in section of a preferred form of apparatus for carrying out the invention.

In my U. S. Patent 1,768,342, issued on June 24, 1930, a process has been described for treating petroleum oil vapors by bringing the vapors in intimate contact in a treating zone with a stream of oil carrying finely divided adsorptive clay, maintaining a temperature sufficient to cause the desired product to pass as vapor from the treating zone and condensing said product. In that process fresh or regenerated clay is supplied continuously to the treating zone in order to obtain the desired effect, namely decolorization of the oil together with polymerization of highly saturated hydrocarbons, the presence of which in the gasoline would lead to gum formation.

I have now discovered that adsorptive clay even after its decolorizing value has stopped will very materially stabilize the color of a naphtha distillate and especially of a cracked gasoline. It also prevents the deposition of gum in the produced gasoline during storage which would occur in many cases if the oil was not treated. The process of the present invention is carried out by circulating the adsorptive clay continually in a treating tower without the necessity of discarding or revivifying it. By this process a stable gasoline is produced which has a comparatively low color, say around 15 Saybolt, and is very suitable for dyeing.

Referring now to the drawing, reference numeral 1 denotes a distillation vessel which may be a shell still, as shown, or other suitable equipment. The still may be arranged in a heated furnace 2, or may be heated by any other appropriate means such as, for example, a heating coil arranged within the still from which coil a heating fluid is passed. A pipe 3 having a perforated distributing arm 4 may be used for supplying steam or the like when this is desirable. The still is connected by a vapor line 5 with a fractionating column 6. The column may have the usual bell cap plates 7 and the reflux return lines or any other equivalent vapor liquid contacting means. A cooling coil 8 may be arranged in the upper portion of the column. A pipe 9 entering the bottom of the column 6 is connected with a source of the liquid oil to be charged into the still. A treating tower 10 is provided which is connected with column 6 by means of a vapor line 11. In this column the vapors are brought into intimate contact with a finely divided adsorptive clay, with or without a chemical treating agent. A cooling coil 8a may be provided for regulating the temperature in the upper part of the treating tower. The tower 10 contains a series of bell cap plates with reflux lines or screens, baffles or similar means for bringing vapors, liquids and solids into intimate contact. Finely divided adsorbent clay will pass readily in admixture with oil through baffle means of the general nature indicated and in so doing adsorbent clay is brought into intimate contact with hydrocarbon vapors passing upwardly in the tower. A feed line 14 connected with a receptacle 15 for the adsorbent clay is arranged to discharge upon an upper plate. The receptacle 15 is preferably provided with an agitator to keep the clay in suspension in oil.

A settling tank 16 is connected to receive the solid adsorbent and condensate formed in the tower 10. A pump 16a conveys the oil from an upper portion of tank 16 to the fractionating column 6 through line 17. This line is provided with a plurality of valved branches 18, two being shown by way of illustration, so that the point of return of condensate oil to the tower may be regulated. Tank 16 is also provided with a draw-off 19, return line 19a, and a pump 19b. The clay slurry is pumped through the line 19a back to the receptacle 15 and thus recirculated to the tower 10.

A vapor line 20 leads from the top of the tower 10 to a condenser 21 in which the treated vapors are condensed and flow into receiver 22. A gas line 23 is provided on this receiver and the valve on the vent may be used to control pressure on the system.

The adsorptive clay may be of the type of Utah clay, Attapulgus clay, the various grades of fuller's earth, activated clay, etc. The process is particularly advantageous for treating cracked stocks, but natural naphtha, gasoline, kerosene or lubricating oils may also be treated in accordance with the invention. In the following the treatment of cracked naphtha will be described by way of illustration.

The still 1 is charged with the cracked naphtha and is brought to a distillation temperature, the vapors from the still passing through the fractionating column 6. The fraction in column 6 is controlled by the amount of cooling from coil 8 and also by regulation of the return of condensate through lines 18. Finely divided Attapulgus clay, preferably of 100–200 mesh fineness, suspended in a suitable carrier oil is supplied to the treating tower from receptacle 15 through line 14. I prefer to use as a carrier oil for the clay an oil which has already been subjected to the process. However, a portion of the oil to be treated or other oil not detrimentally affecting the product may be used. It is possible to supply the clay without admixture with oil outside of the treating tower. In this case the condensate formed in the tower will wash the clay down through the plates. In any case, a continuous current of oil clay slurry passing in countercurrent to the vapors to be treated in tower 10 is provided. The temperature in the tower is maintained sufficiently high ultimately to volatilize substantially all the constituents desired in the final product. The temperature may be regulated by both controlling the temperature of the vapors in entering the bottom of the tower and by changing the rate of the cooling from coil 8a. It is readily understood that in the tower 10 fractionation and treating go on simultaneously and that the vapors may momentarily condense during some portion of their travel through the tower and thus be subjected in liquid phase to the action of the adsorbent clay. Excess condensate from tank 16 may be returned continuously or intermittently to the column 6 as reflux medium.

The important feature of the present invention is the recirculation of the clay slurry to the treating tower. After a sufficient quantity of fresh clay or spent clay used in a prior process has been introduced into the tower 10 to maintain the required steady downflow of oil clay slurry, no more fresh clay is added but the treating is carried out by recirculating the clay removed from tank 16.

The following example will illustrate my invention:

A rerun still for cracked naphtha having a capacity of 100 bbls. an hour overhead was charged and brought up in temperature in the usual manner. The clay slurry was then pumped to the top of the treating tower until sufficient had passed down through the tower to be sure that the clay was running through the treating zone uniformly. The fresh clay was then discontinued and the clay at the bottom of the tower was circulated up to the top of the tower. This procedure was continued for one week during which time the gasoline had a color of 15 to 18 Saybolt and was of excellent gum stability. From all indications the operation could have been continued for an indefinite period. The only thing noticed during the operation was the clay became finer and it was necessary to continuously withdraw a certain amount of condensate which formed in the tower.

The terms "spent decolorizing clay" and "spent decolorizing solid adsorbent material" as employed in this specification and the claims appended hereto are intended to refer to clays or solid adsorbent materials originally capable of effecting decolorization, the decolorizing properties of which have been substantially destroyed by previous treatment.

My invention may be modified in various ways. Thus, for example, the towers 6 and 10 may be combined into one treating tower or the treating tower may be installed in connection with the bubble tower receiving the cracked products from a cracking coil or cracking tower. Other modifications will be apparent to those skilled in the art.

The invention is therefore not to be limited by the example given for illustration, but only by the following claims in which it is my intention to claim all novelty inherent in the invention.

What I claim is:

1. A process for stabilizing the color of light cracked distillate oil which comprises passing said oil in vapor form in countercurrent contact with only solid adsorbent material, the decolorizing power of substantially the entire body of which has been substantially entirely spent by previous treatment of hydrocarbon oils similar to the oil undergoing treatment prior to the use thereof for stabilizing the color of the oil undergoing treatment while maintaining the color of said oil substantially without change while in contact with said material.

2. A process for treating cracked naphtha which comprises passing said naphtha in vapor form into a treating zone, stabilizing the color of said naphtha while maintaining said color substantially without change within said zone by contacting said vapors with only solid adsorbent material, the decolorizing power of substantially the entire body of which has been substantially entirely spent by previous treatment of hydrocarbon oils similar to the oil undergoing treatment prior to the use thereof for stabilizing the color of the oil undergoing treatment, and maintaining the temperature of said zone sufficiently high to cause desired treated constituents of said naphtha to pass as vapors from the treating zone.

3. A process as defined in claim 2 wherein said spent solid adsorbent material is passed through said treating zone countercurrent to the naphtha undergoing treatment therein and is continuously recycled through said treating zone.

4. A method of stabilizing the color of light cracked petroleum distillate which comprises passing hydrocarbon vapors from such petroleum distillate upwardly through a combined fractionating and stabilizing zone, introducing only a decolorizing clay, the decolorizing power of the entire body of which has been substantially entirely spent by previous treatment of hydrocarbon oils similar to the oil undergoing treatment prior to the use thereof for stabilizing the color of the oil undergoing treatment, into the upper portion of said zone, passing said spent decolorizing clay downwardly through said zone in countercurrent contact with vapors passing upwardly therethrough to stabilize the color of said vapors while maintaining the color of said vapors substantially without change in said zone, fractionating the vapors within said zone to condense higher boiling constituents thereof as reflux condensate, withdrawing spent clay and condensate so formed from said zone, separating condensate from said spent clay, returning said spent clay as the only clay used in the process to the upper portion of said combined fractionating and stabilizing zone, withdrawing desired treated constituents as vapors remaining uncondensed in said zone and condensing and separately collecting vapors so withdrawn as a final product of the process.

5. A process for treating petroleum oils which comprises contacting a solid adsorbent decolorizing material with vapors of such oil until the decolorizing power of substantially the entire body of said material is substantially entirely spent prior to the use thereof for stabilizing the color of the oil, thereafter passing additional light cracked distillate in vapor form through a treating zone and stabilizing the color of said distillate while maintaining said color substantially without change in said zone by contacting said vapors last mentioned with only said spent decolorizing material therein.

6. A process for treating petroleum oils which comprises contacting a solid adsorbent decolorizing material with vapors of such oil until the decolorizing power of substantially the entire body of said material is substantially entirely spent prior to the use thereof for stabilizing the color of the oil, thereafter recirculating said spent material through a treating zone, passing additional light cracked distillate oil in the form of vapors through said treating zone and stabilizing the color of said distillate while maintaining said color substantially without change in said zone by contacting said vapors last mentioned with only said spent solid adsorbent decolorizing material therein.

REGINALD K. STRATFORD.